July 29, 1924.                                                                    1,503,065
B. F. SEYMOUR
VEHICLE BODY SUSPENSION
Filed March 11, 1920

Inventor:
B. F. Seymour,
by H. H. Byrne
Atty.

Patented July 29, 1924.

1,503,065

UNITED STATES PATENT OFFICE.

BENJAMIN F. SEYMOUR, OF WASHINGTON, DISTRICT OF COLUMBIA.

VEHICLE BODY SUSPENSION.

Application filed March 11, 1920. Serial No. 365,037.

*To all whom it may concern:*

Be it known that I, BENJAMIN F. SEYMOUR, a citizen of the United States, residing at Washington, in the District of Columbia, have invented certain new and useful Improvements in Vehicle Body Suspensions; and I do hereby declare the following to be a full, clear, and exact description of the invention, such as will enable others skilled in the art to which it appertains to make and use the same.

The present invention relates to resilient suspensions for vehicle bodies and consists in the combinations and arrangements of elements hereinafter described and particularly set forth in the accompanying claims.

The purpose of the invention is to provide the body of a vehicle, especially of the motor driven type, with resilient means for indirectly absorbing and dissipating all shocks or jars to which the vehicle wheel is subjected, and without causing undue strain on either the wheel or its axle or transmitting excessive vibration to the supported load.

Another object of the resilient suspension as proposed herein is the employment of apparatus and disposal of the elements thereof in such a manner as will secure the maximum stability of the resilient sustaining structure, and equitable location or distribution of the resilient devices per se with regard to the chassis or frame on which the same are mounted.

Figure 1:
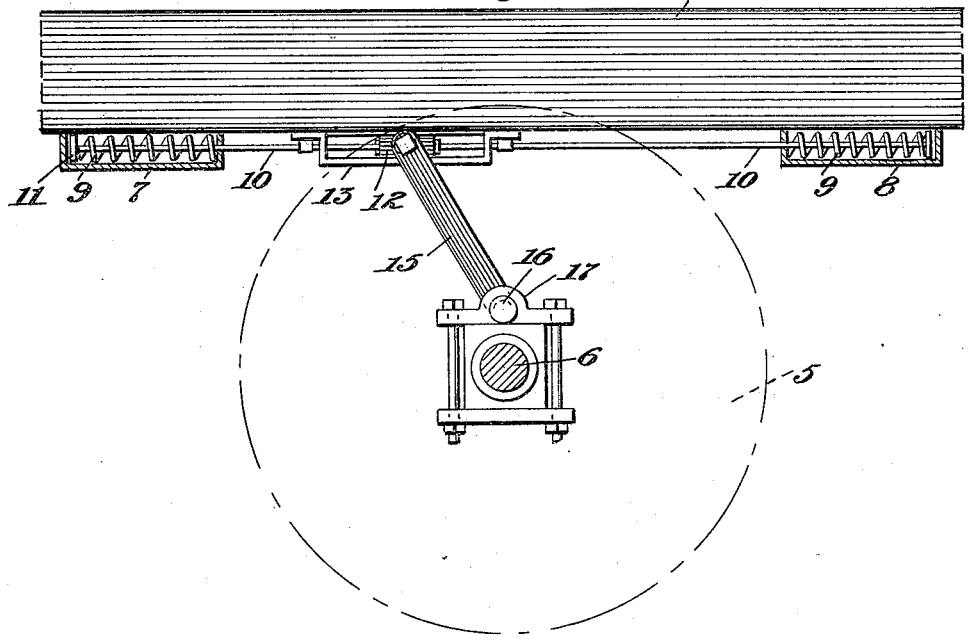
Figure 2:
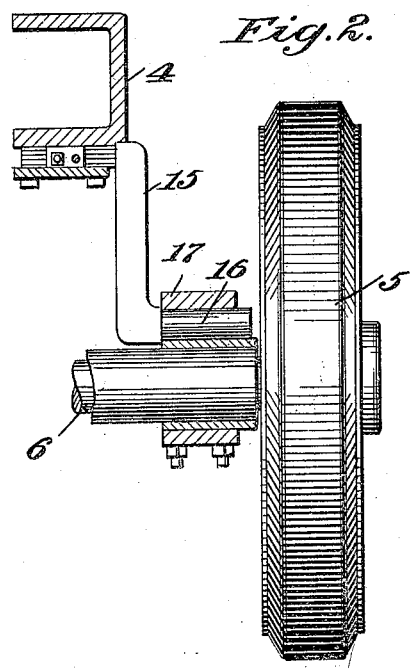
Figure 3:
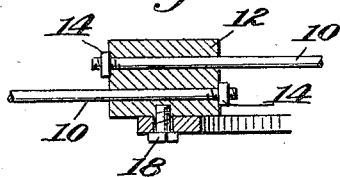

The invention is disclosed by way of illustration in the accompanying drawings, wherein:

Figure 1 is a side elevational view showing a vehicle chassis or frame equipped with the appliance;

Figure 2 a rear elevational view thereof with parts in section;

Figure 3 a detail view of the connecting head or block.

Referring to the construction in further detail, and wherein like reference characters designate corresponding parts in the different figures shown, the apparatus consists of the chassis or frame 4 of the vehicle having the usual wheel 5 journaled on the axle or wheel support 6 in any well known way; and 7 and 8 designate two cylindrical casings secured on the under side of the chassis or frame 4 and disposed longitudinally thereof, as shown. A resilient element, consisting preferably of a spiral spring 9, is located in each of the casings 7 and 8 and normally holds under tension a reach rod 10 having an end piece 11 engaged by said spring, and said end pieces of the reach rods are normally held in distal and opposed relation under the action of the springs.

A reciprocal block or head 12 is mounted to operate in a bracket 13 secured to the under side of the chassis 4 and between the two resilient elements, and said member 12 forms a common connection for the two reach rods 10 which slidably pass therethrough and have retaining nuts 14 screwthreaded on their respective projecting ends (see Figure 3). By this arrangement the block or connecting piece 12 is free to move in either direction and when so doing acts to compress one of the springs while the other spring thereof does not function.

A supporting arm or lever 15 is journaled as at 16 in the bearing block 17 of the axle 6, and said arm 15 is pivotally connected at its upper end by the pivot pin 18 to the sliding block 12, and in which relation said arm acts as a supporting connection between the chassis and the axle of the vehicle to take up any shocks or jars incident to the normal operation of the vehicle wheel.

It is obvious that those skilled in the art may vary the details of construction and arrangement of parts without departing from the spirit of my invention, and therefore I do not wish to be limited to such features except as may be required by the claims.

Having thus described the invention, what is claimed as new and desired to be protected by United States Letters Patent is:—

1. In a resilient suspension for vehicle bodies, the combination with a chassis or frame, a wheel support, and a wheel journaled thereon, of oppositely acting springs operable longitudinally of the chassis, a bracket interposed between said springs and beneath the chassis, a member longitudinally reciprocable in said bracket, reach rods connecting said springs with the reciprocable member, and an arm fulcrumed on the wheel support having supporting connection with said reciprocable member, substantially as set forth.

2. In a resilient suspension for vehicle bodies, the combination with a chassis or frame, a wheel support, and a wheel journaled thereon, of a pair of closed casings mounted below the chassis, springs located in said casings, a bracket interposed between said casings, a member longitudinally reciprocable in said bracket, reach rods connecting said springs with the reciprocable member, and an arm fulcrumed on the wheel support having supporting connection with said reciprocable member, substantially as set forth.

In testimony whereof I affix my signature.

BENJAMIN F. SEYMOUR.